United States Patent [19]

Kuenemund et al.

[11] Patent Number: 4,841,469
[45] Date of Patent: Jun. 20, 1989

[54] MATRIX TIMES MATRIX MULTIPLIER

[75] Inventors: Ronald Kuenemund, Unterhaching; Tobias Noll, Neufahrn, both of Fed. Rep. of Germany

[73] Assignee: Siemens Aktiengesellschaft, Berlin and Munich, Fed. Rep. of Germany

[21] Appl. No.: 222,937

[22] Filed: Jul. 22, 1988

[30] Foreign Application Priority Data

Sep. 1, 1987 [DE] Fed. Rep. of Germany ....... 3729175

[51] Int. Cl.$^4$ .................................................. G06F 7/52
[52] U.S. Cl. .................................................. 364/754
[58] Field of Search ............... 364/754, 757, 724.01, 364/758–760, 749, 736

[56] References Cited

U.S. PATENT DOCUMENTS

| 4,686,645 | 8/1987 | McCanny et al. | 364/754 |
| 4,697,247 | 9/1987 | Grinberg et al. | 364/713 |
| 4,719,588 | 1/1988 | Tatemichi et al. | 364/754 |
| 4,763,365 | 10/1973 | Seitz | 364/754 |
| 4,787,057 | 11/1988 | Hammond | 364/754 |

Primary Examiner—Gary V. Harkcom
Assistant Examiner—Tan V. Mai

[57] ABSTRACT

A circuit for the multiplication of the elements of a multiplicand matrix represented by first digital signals by the elements of a multiplier matrix represented by second digital signals. A multiplicand line is provided for every row of the multiplicand matrix and the individual sections (L11...L14) of these multiplicand lines are connected to bit-associated circuits (bit planes) (BP1...BP4). Every bit plane contains the partial product stages (1, 2, 3) which are allocated to the bits of the second digital signals having a defined significance, and also contain an iterative circuit composed of adders (4, 5) and time delay elements (6, 7, 8) in an alternating arrangement.

2 Claims, 2 Drawing Sheets

MATRIX TIMES MATRIX MULTIPLIER

BACKGROUND OF THE INVENTION

Field of the Invention

The present invention is related to a circuit for multiplying the elements of a multiplicand matrix by the elements of a multiplier matrix.

SUMMARY OF THE INVENTION

It is an object of the present invention to provide a circuit for multiplying the elements of a multiplicand matrix by the elements of a multiplier matrix which can be integrated in a space saving manner on a doped semiconductor body. This is accomplished by using partial product stages, time delays and adders as is further specified in the claims of the invention. The advantages which can be obtained with the invention is that a plurality of bit associated circuits or double bit associated circuits which serve for the multiplication of the digital signals representing the elements of the multiplicand matrix by the digital signals representing the elements of the multiplier matrix can be produced in an extremely small space so that the overall circuit can be produced on a very small semiconductor area.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

The multiplication of elements Xij of a multiplicand matrix by the elements Yij of a multiplier matrix can be represented in the following manner assuming elements per row and column:

$$\begin{bmatrix} X11 & X12 \\ X21 & X22 \end{bmatrix} \cdot \begin{bmatrix} Y11 & Y12 \\ Y21 & Y22 \end{bmatrix} = \begin{bmatrix} C11 & C12 \\ C21 & C22 \end{bmatrix}$$

The following equations result for the elements Cij of the product matrix:

C11=X11.Y11+X12.Y21

C12=X11.Y12+X12.Y22

C21=X21.Y11+X22.Y21

C22=X21.Y12+X22.Y22

Figure 1:
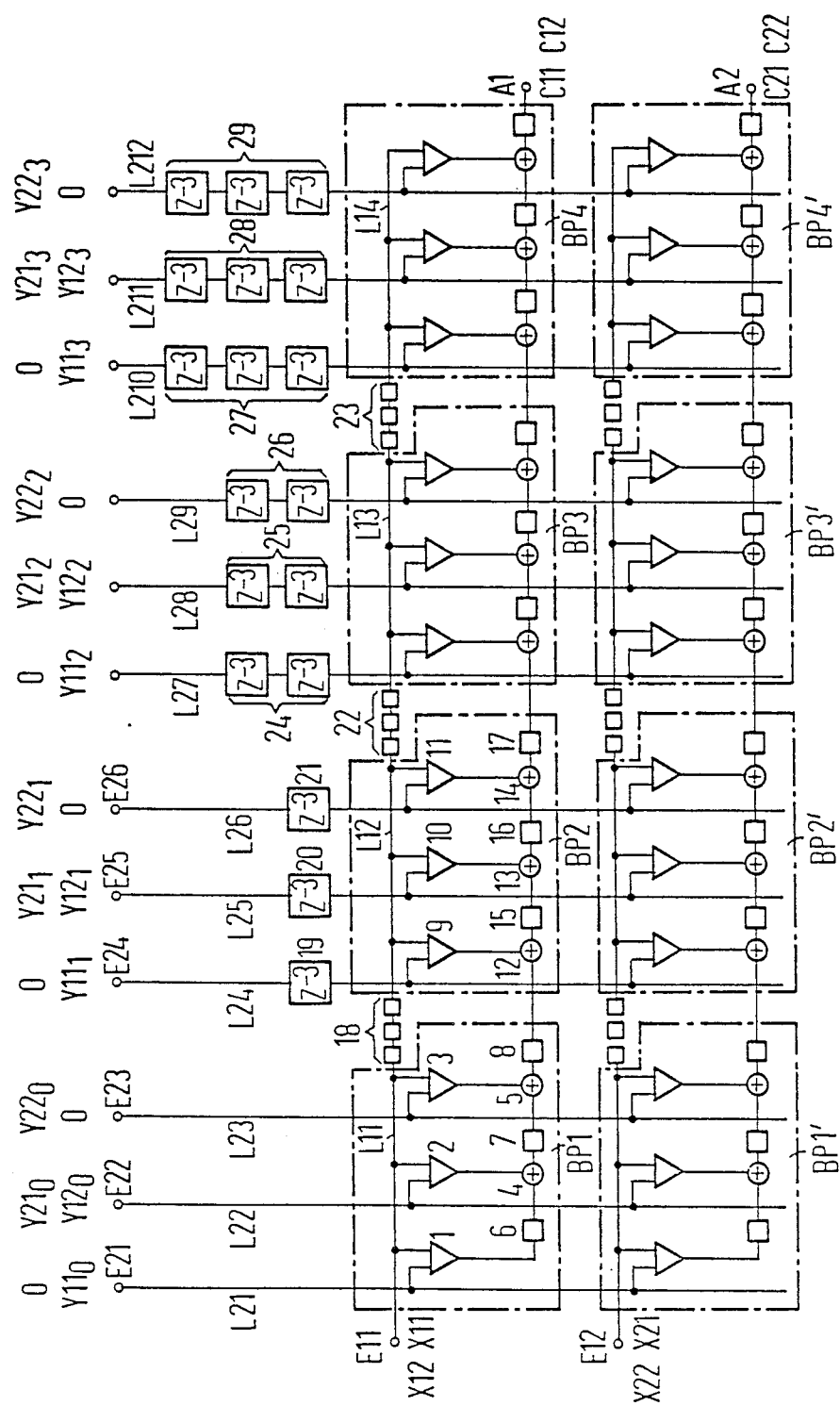
FIG. 1 is a block diagram of a first exemplary embodiment of the invention.

The circuit shown in FIG. 1 for the implementation of this matrix-matrix multiplication which comprises a first multiplicand line which has a plurality of sections L11 thru L14 to the input E11 of which digital signals are supplied. These digital signals represent the elements X11 and X12 of the first row of the X-matrix. The feeding of these signals occurs at a sampling rate of 1/T. L11 is connected to a first, bit-associated circuit BP1. BP1 is composed of three multiplier lines L21 thru L23 which have inputs E21 thru E23 that are supplied with the least significant bits $Yij_0$ of the signals as will be later described in detail. These signals representing the elements of the Y-matrix.

Each of the lines L21 thru L23 is connected to the second inputs of partial product stages 1 thru 3 which have first inputs which are connected to L11. BP1 contains an iterative circuit of adders 4 and 5 and time delay elements 6, 7 and 8 connected in series alternately with the adders 4 and 5. The output of the partial product stage 1 is connected through time delay element 6 to the one input of the adder 4 and its other input is connected to the output of the partial product stage 2. The output of adder 4 is connected through the time delay element 7 to the first input of the adder 5 which has its other input connected to the output of the partial product stage 3. The output of the time delay element 8 receives the output of the adder 5 and represents the output of the iterative circuit BP1.

The second section L12 of the first multiplicand line is connected to a correspondingly constructed, bit-associated circuit BP2 that contains the three multiplier lines L24 thru L26, three partial product stages 9 thru 11 and an iterative circuit composed of the alternate adders 12 thru 14 and the time delay elements 15 thru 17. The section L12 is connected by a delay chain 18 to the section L11 and delay chain 18 produces the delay caused by the time delay elements 6, 7 and 8 of BP1. The signals supplied via E11 and at the output of delay chain 18 are thus synchronized with the intermediate results appearing at the output of the time delay element 8. The lines L24 thru L26 are supplied at their inputs E24 thru E26 with the bits $Yij_1$ of the second-lowest significance. The iterative circuit comprising elements 12, 15, 13, 16, 14 and 17 of circuit BP2 is directly connected to the output of the iterative circuit BP1. Time delay elements 19 thru 21 provide a delay equal to the delay of the delay chain 18 are inserted into the lines L24 thru L26 of BP2 as shown.

The section L13 of the multiplicand line is connected by way of a delay chain 22 to L12; the section L14 is connected to L13 by way of a further delay chain 23. The bit-associated circuit BP3 which is connected to L13 and the circuit BP4 which is connected to L14 are constructed in the same manner as circuit BP2. The multiplier lines L27 thru L29 thus receive the signals $Yij_2$ which have the significance $2^2$ and the lines L210 thru L212 receive the signal bits $Yij_3$ which have the highest significance $2^3$. Time delay elements 24, 25 and 26 are inserted into lines L27 thru L29 and time delay elements 24, 25 and 26 provide delays which equal the delays of the delay chains 18 and 22, the time delay elements 27 thru 29 provide delays which equal the delays of the chains 18, 22 and 23 and are connected into lines L210 thru L212. The iterative circuit BP3 is connected to the output of the iterative circuit of BP2. The iterative circuit BP4 is connected to the output of the iterative circuit BP3. Digital signals can be taken at the output A1 of the iterative circuit of BP4 when the elements C11 and C12 correspond to the first row of the product matrix.

The lower part of FIG. 1 shows a further sub-circuit which comprises an input E12 and an output A2. Between these two terminals, there are formed circuits which are the same as the circuits between the terminals E11 and A1. The line which is connected to E12 is a second multiplicand line and the four sections are separated from each other by delay chains which are each connected to bit-associated circuits BP1' thru BP4'. The multiplier lines L21 thru L212 are extended without the interposition of further time delay elements so that they also pass through the circuits BP1' thru BP4'. The time delay elements 19 thru 21, 24 thru 26 and 27 thru 29 are allocated in common to the circuits BP2 and BP2', BP3 and BP3' and to the circuits BP4 and BP4'. The signals X21 and X22 which represent the elements of the second row of the X-matrix are supplied to E12, and the signals C21 and C22 which represent the elements of the second row of the product matrix appear at terminal A2.

In operation, the respective signals X11 and X21 are adjacent the inputs E11 and E12 during a sampling period $T_n$. The respective signals $Y11_0$, $Y12_0$ and "0" are also adjacent at the lines L21 thru L23 during the sampling period $T_n$. The respective signals $Y11_1$, $Y12_1$ and "0" are adjacent the lines L24 thru L26, the respective signals $Y11_2$, $Y12_2$ and "0" are adjacent the lines L27 thru L29 and the signals $Y11_3$, $Y12_3$ and "0" are adjacent at the lines L210 thru L212. During the sampling period $T_{n+1}$ which follows the respective signals X12 and X22 are adjacent E11 and E12, whereas the lines L21 thru L23 receive "0", $Y21_0$ and $Y22_0$, the lines L24 thru L26 receive "0", $Y21_1$ and $Y22_1$, the lines L27 thru L29 receive "0", $Y21_2$ and $Y22_2$ and the lines L210 thru L212 receive "0", $Y21_2$ and $Y22_3$. The respective signals C12 and C22 then appear at terminals A1 and A2 during a later sampling period and the respective signals C11 and C22 appear within the following sampling period.

When the signals Xij that are supplied at terminals E11 and E12 comprise a word width of n bits, the inputs E11 and E12 are each composed of n terminals. The multiplicand lines which are connected thereto then each comprise n lines that serve for the bit-parallel transmission of the signals Xij. Each of the partial product stages, for example 1, is formed as a line-shaped arrangement of n gates, such as AND gates, whereas the adders, for example 4, are each composed of a line-shaped arrangement of full adders that are respectively required for bit-parallel addition of two n-place input signals. The utilization of carry-save adder stages or carry-ripple adder stages which have additional pipelining in the transmission direction of the carry signals are particularly advantageous.

In FIG. 1, all of the time delay elements, for example 6, 7, 8, of the iterative circuits in the bit-associated circuits as well as the individual stages of the delay chains, for example 18, 22 and 23, are formed as clocked shift register stages which have master-slave structure, whereby every individual time delay element or, respectively, each individual stage of these stages causes a time delay of one sampling period. The delay elements 19 thru 21, 24 thru 26 and 27 thru 29 are constructed of shift register stages, and the symbols $z^{-3}$ in the blocks, respectively identify delay times of three sampling periods.

The plurality of multiplier lines, for example L21 thru L23, allocated to a bit-associated circuit, for example BP1, corresponds in general terms to the plurality m of row elements of the Y-matrix increased by the number of the rows of the matrix diminished by 1. During the sampling period $T_n$, the signals which represent the row elements of the first row of the Y-matrix are supplied to the first m multiplier lines of a bit-associated circuit, beginning with the line which is at the outermost left in FIG. 1. The lines which no longer carry these signals are occupied with a zero. During the next sampling period $T_{n+1}$, the signals which represent the elements of the second row of the Y-matrix are applied offset by one line toward the right, and the lines which are again not occupied are respectively occupied with a "0". During the following sampling period, the signals that represent the elements of the third row of the Y-matrix are applied to the multiplier lines which are respectively offset by a further line toward the right, whereby the lines that are again not occupied are occupied with a "0", etc.

The plurality of sections of the multiplicand lines and the plurality of bit-associated circuits generally correspond to the word width of the Yij signals. When the word width p of these signals is greater than 4, then the number of sections shown in FIG. 1 is increased to Llp and the number of bit-associated circuits is increased to BPp. Further, the plurality of multiplicand lines corresponds to the number of rows of the X-matrix, whereby the signals that correspond to the elements of the matrix row allocated to such line are supplied to the input of each and every multiplicand line.

Figure 2:
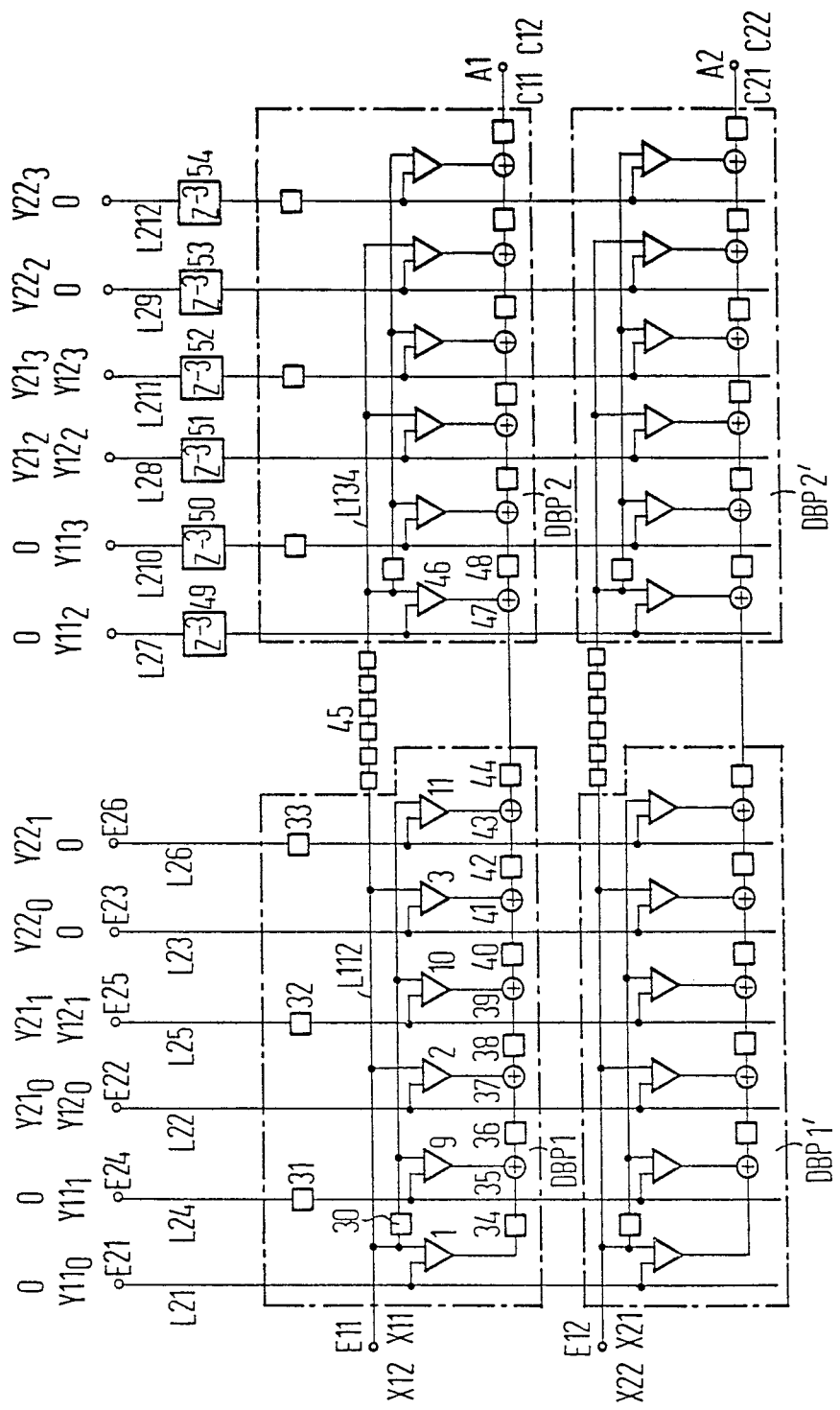
FIG. 2 is a block diagram of a second exemplary embodiment.

The exemplary embodiment shown in FIG. 2 differs from FIG. 1 in that the bit-associated circuits BP1 and BP2 are combined to form a double-bit-associated circuit DBP1. BP3 and BP4 are likewise combined to form a double-bit-associated circuit DBP2. The lines L21, L24, L22, L25, L23 and L26 are arranged next to one another in sequence. The partial product stages 1, 9, 2, 10, 3 and 11 are provided next to the allocated multiplier lines in sequence. The first inputs of the partial product stages 1, 2 and 3 are directly connected, as previously to L112 of the first multiplicand line, but the first inputs of the partial product stages 9, 10 and 11 are connected through a time delay stage 30. The second inputs of stages 1, 9, 2, 10, 3 and 11 are each connected to the associated multiplier lines L21 thru L26, whereby time delay stages 31, 32 and 33 are inserted into the lines L24, L25 and L26.

The output of the partial product stage 1 is supplied through a time delay stage 34 to one input of the adder 35 which has its other input connected to the output of the partial product stage 9. The output of adder 35 is connected through a time delay stage 36 to one input of an adder 37 which has its other input connected to the output of stage 2. The output of adder 37 is connected through a time delay stage 38 to an adder 39 which has its other input is connected to the output of stage 10. The output of adder 39 is connected through a time delay stage 40 to one input of an adder 41 which has its other input connected to the output of stage 3. The output of adder 41 is supplied through a time delay stage 42 to the first input of an adder 43 which has its other input connected to the output of stage 11. A time delay stage 44 is connected to the output of adder 43 and represents the output of an iterative circuit of DBP1 which is composed of the adders 35, 37, 39, 41 and 43 and the time delay stages 34, 36, 38, 40, 42 and 44.

A second section L134 of the first multiplicand line that is separated from L112 by a delay chain 45 is connected to a double-bit-associated circuit DBP2 which is constructed similarly to circuit DBP1. One difference is that the first partial product stage 46 of DBP2, is connected to the input of an adder 47 which receives an input from delay 44 and its output is connected to the first delay stage 48 of the iterative circuit of DBP2. However, the output of partial product stage could be applied to the input of an adder which has its other input supplied with a "0" and its output would then be at the input of time delay 34 without modifying the function of DBP1. Time delay stages 49 thru 54 simulate the delay of the chain 45 are inserted into the multiplier lines L27 thru L212. The signals that correspond to the first row of the product matrix can again be taken at the output A1 of the iterative circuit DBP2.

A further sub-circuit that completely corresponds to the sub-circuit between the terminals E11 and A1 is located between terminals E12 and A2 in FIG. 2. The signals which correspond to the elements of the second row of the X-matrix are supplied to terminal E12, and the signals which correspond to the elements of the second row of the product matrix occur at terminal A2. The double-bit-associated circuits of the lower sub-circuit are referenced DBP1' and DBP2'. The multiplier lines L21 thru L212 receive the same signals in FIG. 2 as in FIG. 1.

The time delay stages, for example 30, 31 thru 33, 34, 36, 48, etc., shown in FIG. 2 are preferably formed as register half-stages, for example as D-flip-flops, and each cause a delay corresponds to a half sampling period of the signals supplied at terminals E11 and E12. The time delay stages 49 thru 54 each cause a time delay of three sampling periods. As a result of the forming of the time delay stages as register half-stages, the circuit of FIG. 2 can be realized on a significantly smaller semiconductor area than the circuit of FIG. 1.

Although the invention has been described with respect to preferred embodiments, it is not to be so limited as changes and modifications can be made which are within the full intended scope of the invention as defined by the appended claims.

We claim as our invention:

1. A circuit for the multiplication of the elements of a multiplicand matrix represented by digital signals by the elements of a multiplier matrix represented by digital signals, characterized in that a first multiplicand line comprises a plurality of sections (L11 ... L14), an input (E11) is supplied with the digital signals that represent the elements of the first row of the multiplicand matrix at a prescribed sampling rate; a first section (L11) of the said plurality of sections of said first multiplicand line is connected to a first bit-associated circuit (BP1) associated with the least-significant bits of the elements of the multiplier matrix, said first bit-associated circuit formed of a plurality of multiplier lines (L21 ... L23) which receive said bits, said plurality of multiplier lines corresponding to the number of elements of a matrix row of the multiplier matrix increased by the number of rows of the matrix diminished by 1, said first bit-associated circuit further including a plurality of partial product stages (1, 2, 3) individually connected to the multiplier lines (L21 ... L23), the first inputs of said partial product stages connected to the first section (L11) of the first multiplicand line and the second inputs thereof being respectivly connected to the multiplier lines (L21 ... L23), and said first bit-associated circuit including a first iterative circuit of adders (4, 5) and respectively alternately connected time delay elements (6 ... 8), and the outputs of said partial product stages are connected to inputs of said adders (4, 5); and each further section (L12) of the first multiplicand line is connected to a further, similarly constructed, bit-associated circuit (BP2) which is respectively associated with a more-significant bit of the elements of the multiplier matrix, and every every further section (L12) of the first multiplicand line is connected through a delay chain (18) to the respectively preceding section (L11) which cause a delay which is established by the iterative circuit of the bit-associated circuit (BP1) connected to the preceding section (L11), and time-delay elements (19 ... 21) connected in the multiplier lines (L24 ... L26) of every further bit-associated circuit (BP2), and the time delay of said delay elements equaling the sum of all delays (18) which are inserted into the allocated and all preceeding sections (L12, L11) of the first multiplicand line, and the further iterative circuit of adders (12 ... 14) comprising respectively interposed time delay elements (15 ... 17) of every further bit-associated circuit (BP2) is connected to the output of the corresponding iterative circuit of the immediately preceding, bit-associated circuit (BP1); first digital signals of the output that represent the elements of the first roll of the product matrix occuring at the output of the iterative circuit of the bit-associated circuit (BP4) for the most significant bits of the elements of the multiplier matrix, further multiplicand lines comprising a plurality of sections respectively allocated to the further rows of the multiplicand matrix and their inputs (L12) being supplied with digital signals which represent the elements of the further rows of the multiplicand matrix and supplied at the said sampling rate; the individual sections of every further multiplicand line connected to bit-associated circuits (BP1' ... BP4') the same as the corresponding sections (L11 ... L14) of the first multiplicand line; further digital signals of the output of the elements of the further rolls of the product matrix occur at the outputs of the iterative circuits of the bit-associated circuits (BP4') for the most significant bits of the elements of the multiplier matrix, and such bit-associated circuits connected to the last sections of the further multiplicand lines and the time delay elements (6, 7, 8, 15, 16, 17) connected between the adders (4, 5, 12, 13, 14) of the individual iterative circuits each providee delays which correspond to a clock period of the digital signal supplied to the inputs (E11, E12) of the multiplicand lines.

2. A circuit for the multiplication of the elements of a multiplicand matrix represented by digital signals by the elements of a multiplier matrix represented by digital signals, characterized in that a first multiplicand line comprises a plurality of sections (L112, L134), the input (E11) of said first multiplicand line supplied with digital signals that represent the elements of the first row of the multiplicand matrix, and supplied at a prescribed sampling rate; the first section (L112) of the first multiplicand line is connected to a first double-bit-associated circuit (DBP1) corresponding to the bits of the lowest and second-lowest significance of the elements of the multiplier matrix, said first double-bit-associated circuit composed of a plurality of multiplier lines (L12 ... L26) which receive the bits having the lowest and second-lowest significance, said plurality of multiplier lines corresponding in number to twice the number of elements of a matrix row of the multiplier matrix increased by twice the number of the rows of the matrix reduced by 2, said first double-bit-associated circuit being further composed of partial product stages (1, 9, 2, 10, 3, 11) individually allocated to the multiplier lines (L12 ... L26), whereby the first inputs of the partial product stages (1, 2, 3) for the bits having the lowest significance are connected to the first section (L112) of the first multiplicand line and the second inputs of these stages are connected to the associated multiplier lines (L21, L22, L23) and the first inputs of the partial product stages (9, 10, 11) for the bits having the second-lowest significance are connected through a delay stage (30) to the first section (L112) of the first multiplicand line and the second inputs of these latter stages are respectively connected through a further delay stage (31, 32, 33) to the associated multiplier lines (L24, L25, L26), and said first double-bit-associated including a first iterative circuit of adders (35, 37, 39, 41, 43) and alternately interposed time delay elements (34, 36, 38, 40, 42, 44), and the outputs of the partial product stages (1, 9, 2, 10, 3, 11) are connected to the free inputs of the adders (35, 37, 39, 41, 43); and every further section (L134) of the first multiplicand line is connected to a further, similarly constructed, double-bit-associated circuit (DBP2) which is associated to respectively two more-significant bits of the elements of the multiplier matrix, and every further section (L134) of the first multiplicand line is connected through a time delay chain (45) to the respectively preceding section (L112) which has a delay of the iterative circuit of the double-bit-associated circuit (DBP1) that is connected to the preceding section (L112), and time delay stages (49 . . . 54) are inserted into the multiplier lines (L27 . . . L212) of every further, double-bit-associated circuit (DBP2), the delay of said time-delay stages equaling the sum of all delays (45) inserted into the associated line (L134) and all preceding sections (L112) of the first multiplicand line, the further iterative circuit of adders (47 . . . ) and respectively altrnatley interposed time delay elements (48 . . . ) for every further double-bit-associated circuit (DBP2) is connected to the output of the corresponding iterative circuit of the immediately preceding double-bit-associated circuit (DBP1); first digital signals of the output which represent the elements of the first row of the product matrix occurring at the output of the iterative circuit of the double-bit-associated circuit associated with the two most significant bits of the elements of the multiplier matrix; further multiplicand lines comprising a plurality of sections respectively associated with the further rows of the multiplicand matrix and there inputs (E12) being supplied with digital signals which represent the elements of the further rows of the multiplicand matrix and supplied therewith at the said sampling rate; the individual sections of every further multiplicand line connected to identical, double-bit-associated circuits (DBP1', DBP2') to the corresponding sections of the first multiplicand line; further digital signals of the output side which represent the elements of the further rows of the product matrix occur at the outputs of the iterative circuits of the double-bit-associated circuits associated with the two most significant bits of the elements of the multiplier matrix, said double-bit-associated circuits being connected to the last sections of the further multiplicand lines; and in that the time delay stages (34, 36, 38, 40, 42, 44, 48) alternately connected between the adders (35, 37, 39, 41, 43, 47 . . . ) of the individual iterative circuits and the time delay stages (30, 31, 32, 33) preceding the inputs of the partial product stages (9, 10, 11) each have a delay which corresponds to one-half a clock period of the digital signals which are supplied to the inputs of the multiplicand lines.

\* \* \* \* \*